Dec. 31, 1957  B. F. VOGELAAR  2,818,126
HYDRAULIC DRIVING AND STEERING TRANSMISSION FOR VEHICLES
Filed May 2, 1956  6 Sheets-Sheet 1
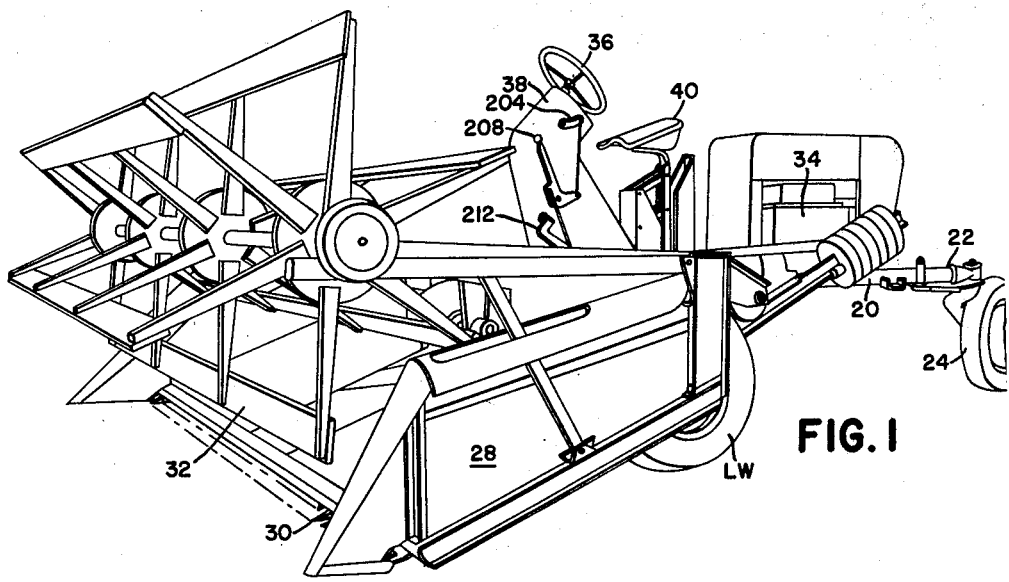
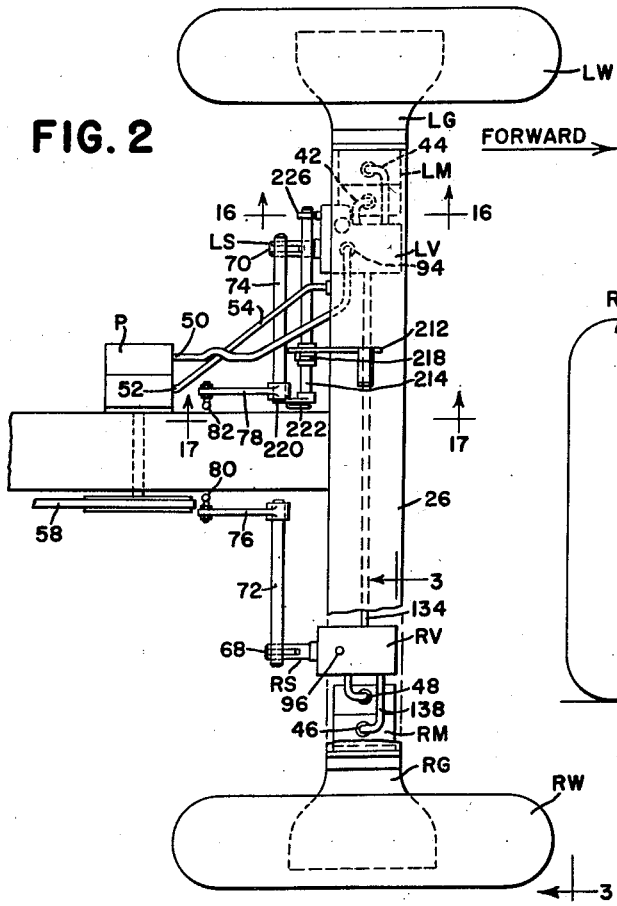
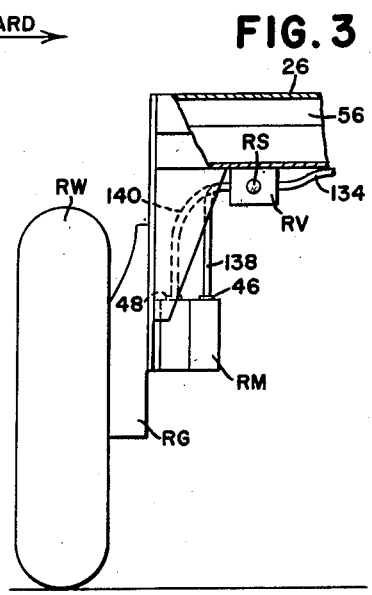
*INVENTOR.*
B. F. VOGELAAR

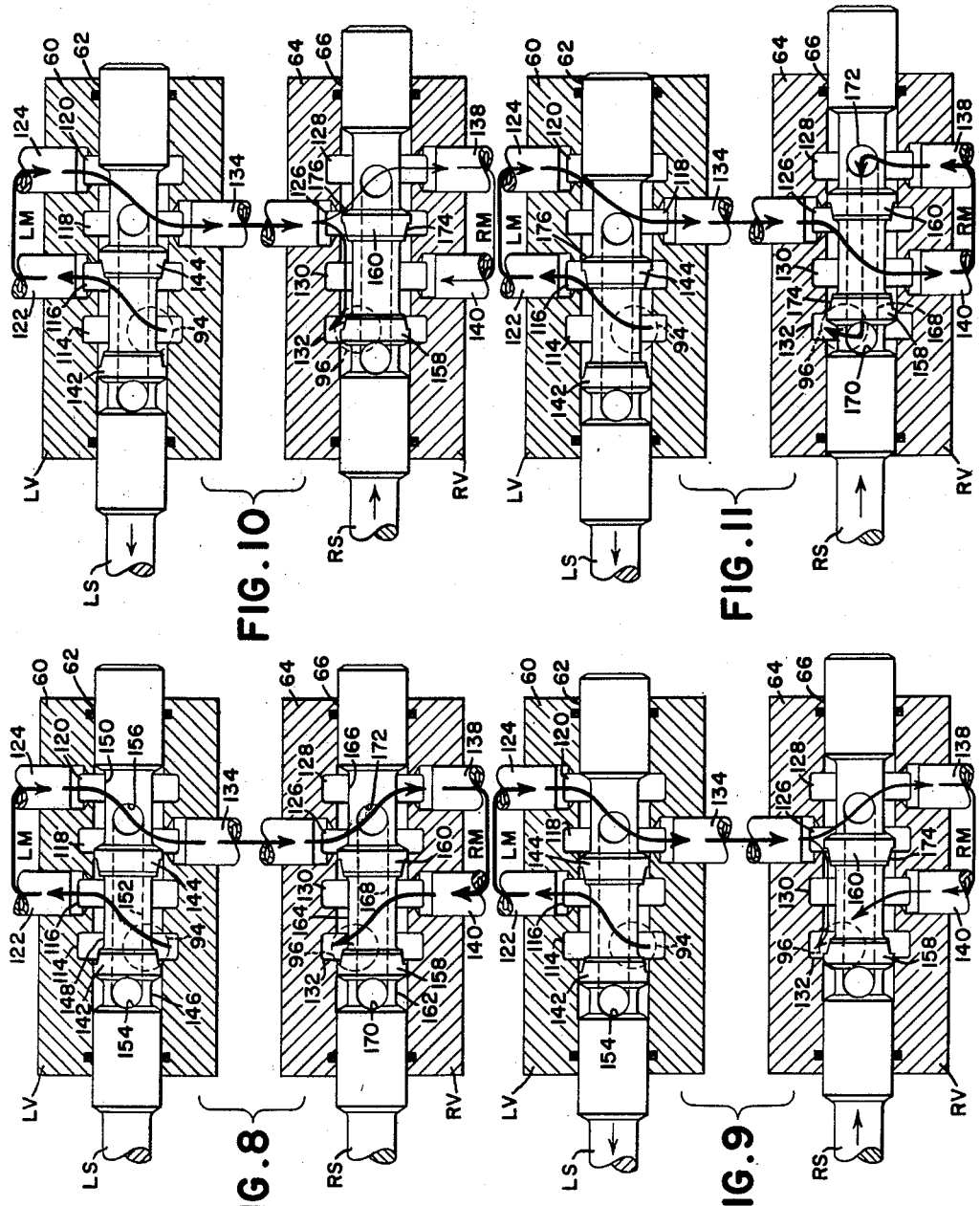

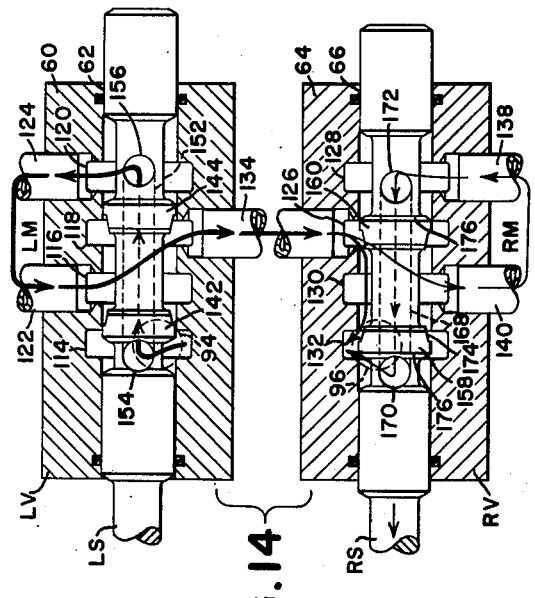
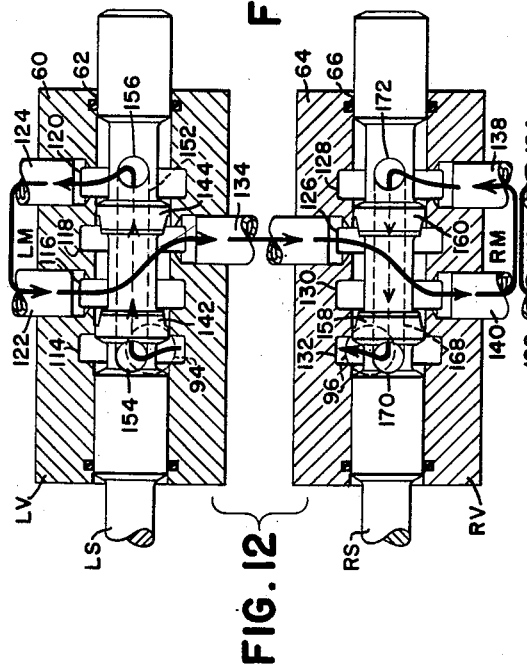
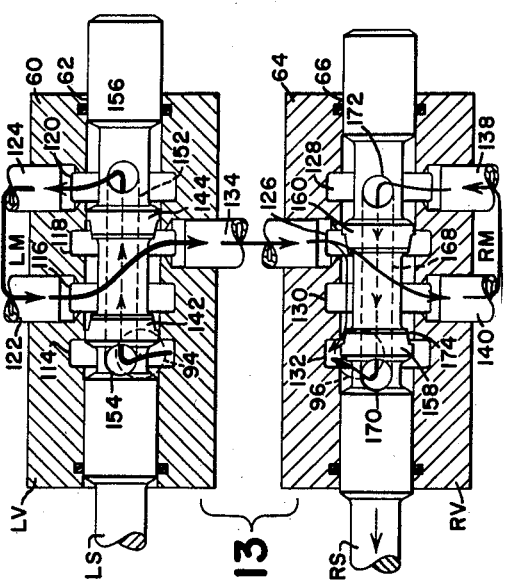

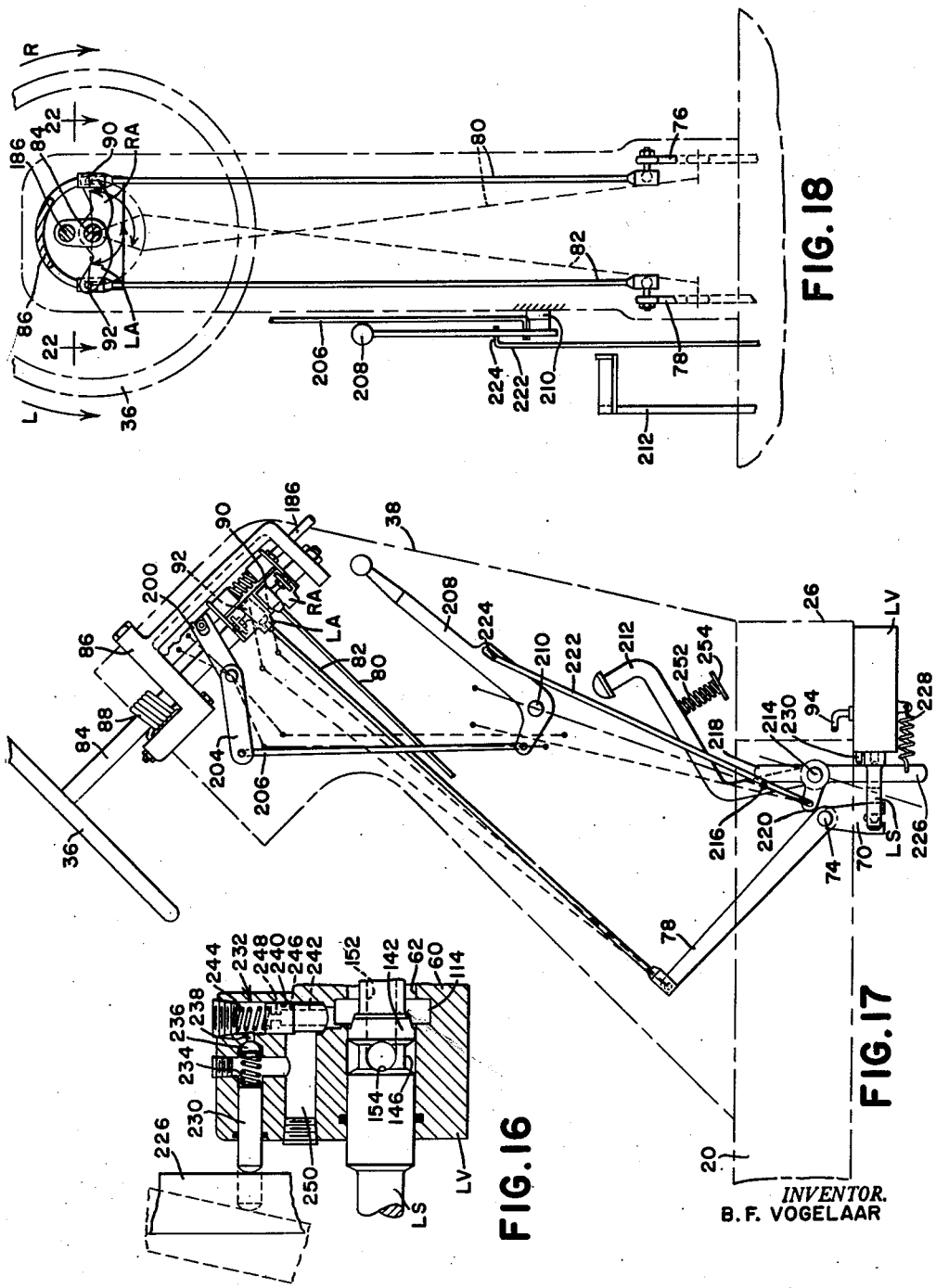

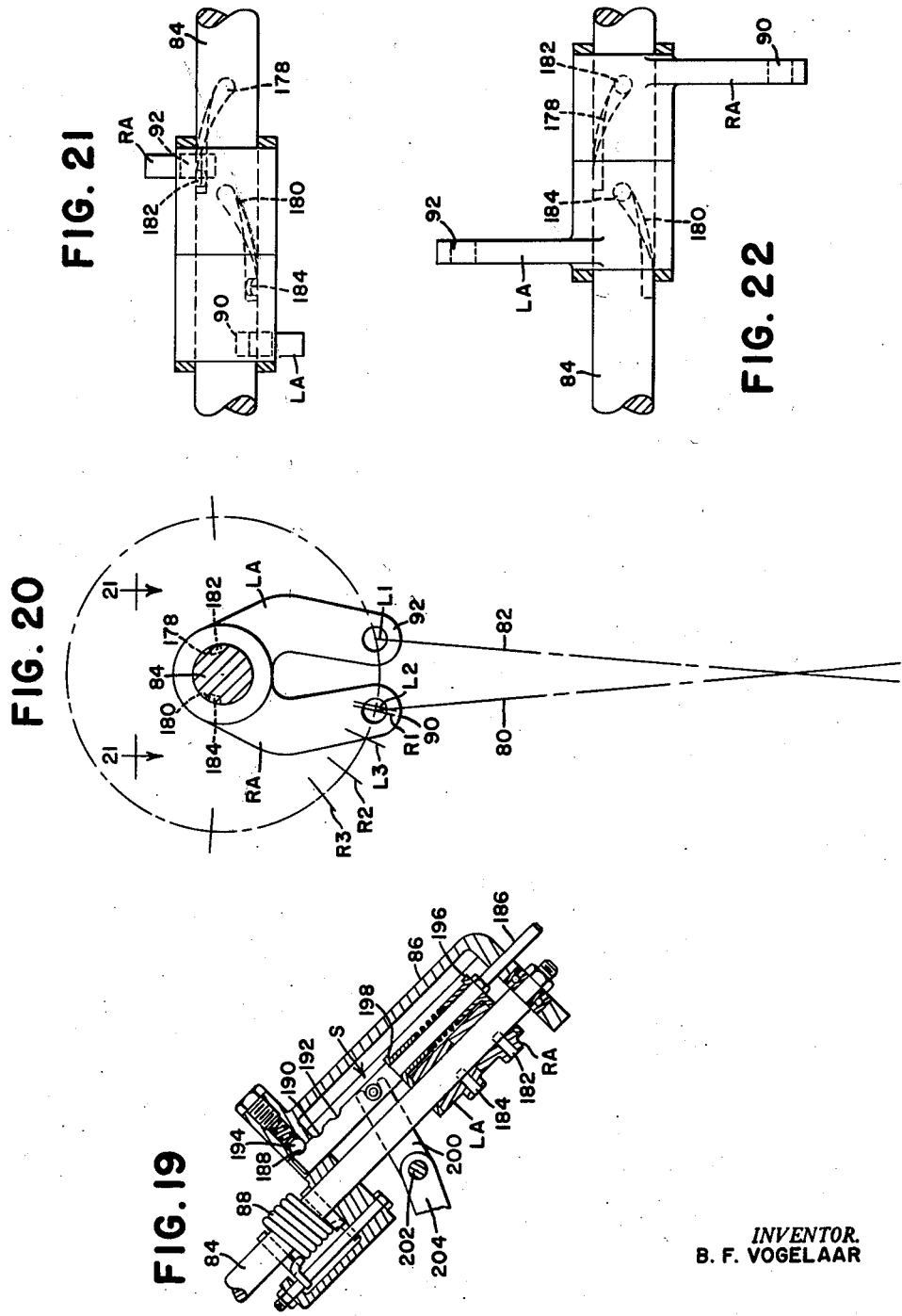

United States Patent Office 2,818,126
Patented Dec. 31, 1957

2,818,126

HYDRAULIC DRIVING AND STEERING TRANSMISSION FOR VEHICLES

Bernard F. Vogelaar, Moline, Ill., assignor to Deere & Company, Moline, Ill., a corporation of Illinois Application May 2, 1956, Serial No. 582,276

17 Claims. (Cl. 180—6.48)

This invention relates to a hydraulic transmission and primarily to a transmission including individual wheel motors connected to vehicle-supporting wheels and controlled to drive and steer the vehicle.

The invention has for a principal object the provision of an improved hydraulic transmission, preferably of the hydrostatic type, involving the control of a pair of laterally spaced wheels, wherein the direction of the vehicle is dependent upon the differences in speeds and directions of rotation of the wheels. It is an important object of the invention to utilize the hydraulic transmission in a vehicle for supporting a harvester, since it is in that field that driving and steering of the type covered herein offers the best solution to many problems.

The invention features the utilization of a control incorporating substantially identical valves, one for the right fluid motor and the other for the left fluid motor, the valves being arranged for operation in unison but in opposite directions. A primary object of the invention is to provide a hydraulic system using a series connection between the pressure source and the motors, so that the pressure source output is directed to one motor and the output of that motor is directed to the other motor, the motors being of uniform capacity so that when both are operated at the same speed and in the same direction, straight-ahead travel of the vehicle is obtainable. The invention incorporates means for shunting part of the fluid flow from one motor so as to obtain variations in speed of that motor relative to the full speed of the other motor. Other characteristics of the control include provision for reversing one motor while maintaining forward operation of the other, reversing one motor while stopping the other, and other variations that will appear as the description progresses.

It is an important object of this invention to provide novel valve control mechanism including a pair of valves, one for each motor, and having starting positions from which the valves are selectively moved to operate the vehicle forward, for example, plus mechanical means for re-arranging the valves as to respective starting positions for operation of the vehicle in reverse as distinguished from the use of a separate reversing valve as disclosed and claimed in my copending application, Ser. No. 579,046, filed April 18, 1956. In this respect, it is a feature of the control mechanism to provide actuating means effective to alter the starting positions of the valves to thereby obtain substantially identical driving and steering characteristics whether the vehicle is traveling forwardly or rearwardly.

The foregoing and other important objects and desirable features inherent in and encompassed by the invention will become apparent as a preferred embodiment is disclosed in detail in the ensuing specification and accompanying sheets of drawings, the several figures of which will be described immediately below.

Fig. 1 is a perspective view of a self-propelled windrow harvester, chosen as representative of a vehicle to which the steering and driving system is applicable.

Fig. 2 is a fragmentary plan view, on an enlarged scale, of a forward portion of the vehicle, illustrating, somewhat schematically, the hydraulic circuit.

Fig. 3 is a section on the line 3—3 of Fig. 2.

Fig. 8 is a sectional view through the right and left control valves, showing the valve spools in their straight-ahead positions.

Figs. 9, 10 and 11 are similar views, showing the valve spools in other positions, all with respect to the accomplishment of steering to the right.

Figs. 12, 13 and 14 are similar views showing the valve spools in other positions relative to the accomplishment of steering to the right while the vehicle is traveling rearwardly.

Fig. 15 is a fragmentary sectional view, on an enlarged scale, showing the construction of one of the shunt lands on a valve spool.

Fig. 16 is an enlarged fragmentary section as seen generally along the line 16—16 of Fig. 2.

Fig. 17 is an elevation, partly in phantom, as would be seen along the line 17—17 of Fig. 2.

Fig. 18 is a rear elevation, partly in phantom, of the upper portion of the structure shown in Fig. 17.

Fig. 19 is an enlarged sectional view of the steering shaft, steering arms and selector means therefor.

Fig. 20 is an enlarged rear view, partly in section, showing the relationship of the steering shaft and steering arms set in their reverse positions.

Fig. 21 is a plan view of the structure shown in Fig. 20, as viewed along the line 21—21 of Fig. 20.

Fig. 22 is a plan view similar to Fig. 21 but showing the structure as it would appear when the steering arms are in their forward positions.

Figure 4:
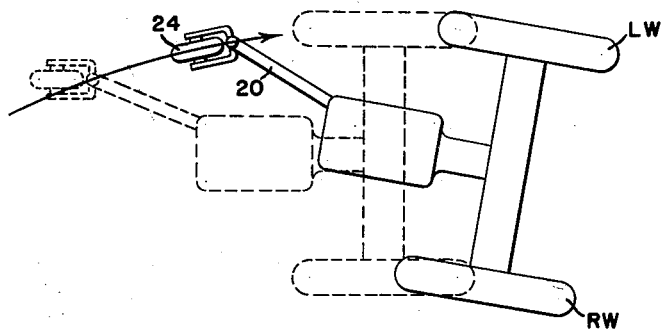
Figs. 4, 5, 6 and 7 are schematic views illustrating different types of right turns that can be accomplished, the dotted lines in each case illustrating the relative straight-ahead position of the vehicle.

The vehicle chosen for the purposes of illustration is a self-propelled windrow harvester, it being understood that this vehicle is representative only and that the principles of the invention can be applied to any comparable structure. This vehicle comprises a fore-and-aft main frame 20 carried at its rear end 22 on a single caster wheel 24 and carried at its front end by means of a transverse tubular front axle 26 and left and right traction wheels LW and RW. The normal straight-ahead direction of travel of the vehicle is indicated by the legend "forward" in Fig. 2. The expressions "left" and "right" are used here with reference to the position of an observer standing behind the machine and looking forwardly. The expression "wheels" is intended to embrace equivalents thereof. However, it should be clear that these expressions are used as terms of convenience and not of limitation, since reversal of the parts from side to side or front to rear is obviously not impossible.

The windrower machine comprises a conventional platform 28 suitably supported ahead of the wheels LW and RW and including a cutter bar 30 and a typical rotating reel 32. In the harvesting of crops by the windrow method, it is extremely important that the machine be capable of turning square corners, thereby eliminating uncut crops in the corners of the field. It is also desirable that the machine be capable of cutting closely along or even up to fences, hedge rows, etc. For these reasons, there is a substantially high degree of maneuverability required and on that basis the invention is illustrated as adapted to a windrowing machine.

The vehicle is powered in any suitable manner, as by an internal combustion engine 34 and is controlled by a steering wheel 36 appropriately supported at 38 ahead of an operator's station or seat 40.

The transverse tubular front axle 26 carries respectively at its left and right ends left and right reduction gear housings LG and RG, respectively, each of which contains appropriate gearing, not shown, for establishing a driving connection between the left wheel and a left fluid motor LM and a driving connection between the right wheel and a right fluid motor RM. The motors may be of any conventional rotary type and are therefore not shown in detail. The motor LM has a fluid inlet 42 and a fluid outlet 44. The right motor has a fluid inlet 46 and a fluid outlet 48.

The hydraulic transmission or circuit includes a pressure source P having a high or discharge side 50 and a low or intake side 52, the latter of which is connected by a line 54 to the hollow interior of the tranverse front axle 26, which therefore affords a reservoir 56 (Fig. 3) forming part of the low side of the pressure source P. The high side or pump part of the pressure source is suitably driven from the vehicle engine 34, as by a belt 58 (Fig. 2), the belt representing either a constant speed or a variable speed drive, whereby the pump, in supplying the wheel motors LM and RM, may also vary the straight-ahead or reverse travel speed of the machine.

The hydraulic circuit, in addition to the pressure source P and motors LM and RM, includes left and right valves LV and RV, respectively. These valves are best shown in detail in Figs. 8 through 14.

The left valve has a housing 60 provided with a substantially cylindrical valve bore 62 in which a left valve spool LS is mounted for axial shifting back and forth among several control positions to be presently described. The right valve is symmetrically constructed, having a housing 64 in which is formed an axial valve bore 66 for axially shiftably carrying a right valve spool RS. The two valves LV and RV are hereinafter referred to as control valves for the left and right motors LM and RM.

In general, the theory of operation of the hydraulic transmission is that the motors LM and RM are in series in the order named, the valves LV and RV being interposed in series between the two motors so that pump delivery flows first to the left valve, thence to the left motor, thence to the right valve, thence to the right motor and thence to the low side of the system. Therefore, in normal forward travel of the machine, the left motor is supplied directly from the pump and the left motor output is supplied to the right motor.

As previously indicated, the invention incorporates novel mechanism for enabling steering and driving of the vehicle in reverse. Fundamentally, this mechanism produces different starting positions for the left and right spools LS and RS. For example, Figs. 8 through 11 show the sequence of movements of the valve spools LS and RS from starting positions included in a forward phase, each valve being movable in that range or phase through a series of control positions including turn and reverse positions. In the turn position, the associated motor is slowed, hence, the position may be referred to as a motor-slowing position; in the reverse position, the associated motor is reversed as to direction, and hence the reverse position may be referred to as a motor-reversing position. It will be understood that each valve has a similar series of positions, but in this range, although both valves move, only one of the valves actually affects its motor while the other effectively retains its straight-ahead position. For example, in steering to the right, the right valve changes the fluid flow effect on the right motor while the left valve, even though also moving, does not affect the left motor until the extreme end of its range. This will be apparent from a comparison of Fig. 9 with Fig. 8. In the reverse phase of the control range of the valves, they are given new starting positions; specifically, the valves are started at their reverse positions and are moved back toward their straight-ahead positions (Figs. 12 through 14).

The difference between the starting positions of the valves in their forward phase and their starting positions in their rearward phase will be best comprehended by comparing Fig. 8, which shows the starting positions for the forward phase, and Fig. 12, which shows the starting positions in the rearward phase.

As best shown in Figs. 2 and 17, the right and left spools RS and LS project rearwardly from their respective valve housings and are operated by right and left hand operator arms 68 and 70 which are fixed respectively to right and left rockshafts 72 and 74. These rockshafts respectively have fixed thereto upwardly and rearwardly extending arms 76 and 78 and these in turn are respectively connected to upwardly and forwardly extending link means or links 80 and 82, which extend into proximity to a steering control member or shaft 84 to which the steering wheel 36 is keyed or otherwise secured. The steering shaft 84 is appropriately carried in a support 86 having suitable mounting in the upper end of the styling standard 38 and is centered in a central or straight-ahead position by a typical centering spring 88.

For the present, let it be assumed that the steering shaft 84 has rigidly secured thereto right and left hand actuator arms or steering arms RA and LA which, as best shown in full lines in Fig. 18, extend radially outwardly in opposite directions from the steering shaft 84 so that the free ends thereof are substantially diametrically opposed and therefore include between them a certain angle. These arms are respectively connected to the links 80 and 82 by conventional articulate connections 90 and 92. In the interests of clarity, the connections at 90 and 92 will be illustrated and described as connecting points, as in Figs. 20 through 22.

On the basis of the foregoing assumption that the arms RA and LA are fixed to the steering shaft 84, it will follow that turning of the steering wheel 36 causes consonant angular movement of the steering shaft 84, with the result that forces are transmitted to the operating arms 76 and 78 and thus to the rockshafts 72 and 74 and thence to the valve spools RS and LS. For example, if the steering wheel 36 is turned to the right, as indicated by the arrow R in Fig. 18, the arm RA will move downwardly or clockwise, transmitting a downward force to the link 80 and causing counterclockwise rocking of the operator arm 76, whereupon the right spool RS will move inwardly. At the same time, the left arm LA moves upwardly, pulling on the link 82 and rocking the operator arm 78 and associated rockshaft 74 clockwise to move the left valve spool outwardly. This will be apparent from the relative positions of the spools RS and LS in Fig. 9, wherein it will be clearly seen that the right spool, on a right turn, is moving inwardly and the left spool, on the same right turn, is moving outwardly. For further clarification, directional arrows have been applied to Figs. 9 through 11. In the case of a left turn (not illustrated), just the opposite motions occur, and the left spool moves inwardly and the right spool moves outwardly. The centering spring 88 will always return the steering wheel 36 and steering shaft 84 to their central or straight-ahead position upon the release of manual force therefrom, which will return the valve spools LS and RS to the Fig. 8 position (as long as the vehicle is set to travel forwardly). Therefore, in the further description of Figs. 8 through 11, Fig. 8 will represent the starting positions of the spools LS and RS in their forward phase.

The discharge side of the pump is connected to the left valve LV at 94 and the low pressure side or reservoir of the pressure source is connected to the right valve at 96. These connections are illustrated by dotted circles in Figs. 8 through 14. The line or passage 94 is in direct communication with an annular groove or port 114 and the two establish an inlet line for the left valve. The housing 60 has additional annular grooves or ports, spaced axially along the valve bore 62, and including a first motor port 116, a discharge port 118 and a second motor port 120. The port 116 is connected by a first left motor line 122 to the left motor inlet 42; and a second left motor line 124 constitutes a return conduit connecting the left motor outlet 44 and the right valve motor return port 120.

The right valve housing 64 has a plurality of axially spaced annular grooves or ports disposed along the bore and including an inlet 126, a first right motor port 128, a second right motor port 130 and a discharge port 132. The discharge port is in permanent communication with the connection 96 which leads to the low side of the pressure source and therefore constitutes a discharge line for the right valve RV. Since the right and left valves are spaced apart on the front axle 26, they are interconnected by a conduit or line 134 which is connected at its opposite ends respectively to the valve housings in communication with the discharge port 118 of the left valve and the inlet port 126 of the right valve. Hence, the passage portions 118 and 134 constitute a discharge line for the left valve and the passage portions 134 and 126 constitute an inlet line for the right valve. The right valve motor port 128 is connected by a first right motor line 138 to the right motor inlet 46; and a second right motor line 140 connects the right motor outlet 48 to the right valve port 130.

The left spool LS has flow control means thereon including a pair of axially spaced annular lands 142 and 144, plus a plurality of intervening grooves or reduced portions 146, 148 and 150. In addition, the spool LS has further flow control means in the form of an axial passage 152 opening at its opposite ends as radial bores 154 and 156, respectively.

Since the valve spools LS and RS are identical, the right spool RS has similar lands and grooves. However, in the interests of maintaining the individual identities of the spools, the lands and grooves of the spool RS will be numbered differently. Hence, the spool RS includes a pair of lands 158 and 160, and a plurality of grooves 162, 164 and 166, in addition to which the spool RS includes an axial passage 168 opening radially at its opposite ends at 170 and 172.

Fig. 15 shows a fragmentary enlargement of that portion of the spool LS including the land 144 and the associated parts of the spool. The lands 142, 158 and 160 are similarly formed and the land 144 as shown in this figure should be taken as representative of all. Hence, each land, of which the land 144 is typical, has flow control portions provided by diametrically opposed flats 174, which constitute shunt valve means as will presently appear. In the interests of avoiding excess numerals in Figs. 8 through 14, the shunt portions on the respective lands, although illustrated, are identified only when the shunt portion is performing a shunt function, the numeral 174 being indicated in each case.

Another characteristic of each land is that at its side opposite the shunt flats 174, it has an annular cut-off edge 176 (Fig. 15). This numeral, for the reasons set forth above, will be applied only when the cut-off is functioning or about to function.

From the description thus far, it will be seen that the valve spools RS and LS start in their starting positions as indicated in Fig. 8 and proceed to end positions beyond those of Fig. 11. Specifically, Fig. 9 is a first or wide turn position in which the shunt portion 174 on the right spool land 160 diverts part of the left motor discharge from the right valve inlet 126 to the right valve discharge line 132—96. Fig. 10 is a shorter turn position in which the diversion of fluid via 174 on the land 160 is in increased volume. As a matter of fact, if the ground resistance to the right wheel is sufficient, the right wheel will stop while the left wheel continues forwardly at its original speed. Hence, the valve positions of Fig. 9 will produce the turning effect illustrated in full lines in Fig. 4; and the valve positions of Fig. 10 will produce the shorter turn illustrated in full lines in Fig. 5. It will be noted that in both of these positions the left spool retains its straight-ahead effective position, even though it has moved outwardly or to the left. Consequently, the left wheel, being the "far" or "outside" wheel is still driven at its original forward speed and the throttling or slowing effect is incurred by the right wheel, which, in the nature of this turn, is the "near" or "inside" wheel.

The same relationship of the valve spools LS and RS exists to a greater extent in Fig. 11. That is to say, the left spool LS still effectively retains its straight-ahead position to retain the forward travel of the left wheel at its original speed. However, the right valve has now moved farther inwardly and the land 158 blocks communication between the right valve ports 130 and 132, whereupon fluid flow from the inlet line 134—126 is switched to the opposite motor line 140, reversing the right motor. Return flow from the motor follows the path of the other motor line 138—128, and enters the axial passage 168 in the spool RS via the radial passage 172 and exits via the other radial passage 170 to return to the reservoir via the discharge line 132—96. The valve positions of Fig. 11 will produce the type of turn illustrated in full lines in Fig. 6, in which the left wheel rotates forwardly at its original speed and the right wheel rotates reversely at a speed equal to its original speed.

Figure 7:
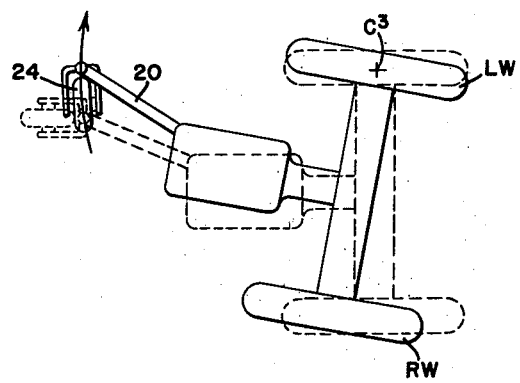

The end positions of the valves are accomplished by a continued rightward turn of the steering wheel 36, whereupon the right spool moves inwardly and the left spool moves outwardly beyond their respective positions of Fig. 11. In this stage of operation, the land 160 still retains its position intermediate the right valve ports 126 and 128 and accordingly incurs fluid flow to the opposite side of the right motor RM so as to drive that motor in the reverse direction. However, as the left spool LS moves outwardly or to the left of its Fig. 11 position, the cut-off edge 176 thereof, which in Fig. 11 is just at the right hand edge of the port 116, moves to the left of that port and consequently is in a by-pass position, because fluid entering the inlet line 94—114 will take the path of least resistance and accordingly will by-pass the left motor LM, flowing past the cut-off 176 to the discharge line 118—134. The result is that the left wheel will come to a stop and the right wheel will continue to drive reversely. See Fig. 7.

Figure 5:
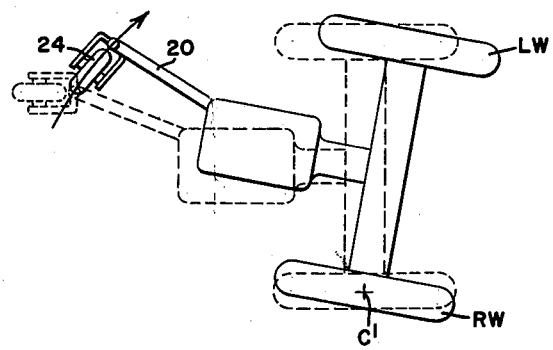

The arcs of steering can best be appreciated from the path of the arrow through the caster wheel 24 in Figs. 4, 5, 6 and 7. For example, in Fig. 4, the approximate center of steering is at the point C (which will be found located in Fig. 6). The center of steering in Fig. 5 is about the point $C^1$, in Fig. 6 about the point $C^2$ and in Fig. 7 about the point $C^3$. Thus, a variety of steering situations can be achieved and the maneuverability of the vehicle is considerably improved by the driving and steering control mechanism according to this invention. In addition to these features, the invention also provides means for accomplishing substantially similar results while the vehicle is traveling rearwardly. These details will be pointed out immediately below.

In the foregoing description, it has been assumed that the right and left steering arms RA and LA are fixed to the steering shaft 84. This is, of course, true in one respect, at least to the extent that these arms are fixed to the shaft 84 during the forward phase. However, the arms are selectively adjustable to new positions, in which positions they function in a second or reverse range. The new positions relative to the old positions are shown in broken lines in Fig. 18 and in full lines in Fig. 20. The difference between the positions of the arms in their forward range and in their reverse range is represented largely by a difference in the location of the points 90 and 92. In Fig. 18 (full lines), which represents the arms in their forward range, the arms extend substantially diametrically outwardly from the steering shaft 84 when the steering shaft occupies its straight-ahead position and the diameter which the arms occupy is substantially horizontal. Of course, this diametrical relationship is retained regardless of the position of the steering shaft and the angle included between the arms will be always the same; here, approximately 180°. As long as the arms occupy these positions, the steering wheel is effective to achieve the various positions of Figs. 8 through 11 plus a position beyond that shown in Fig. 11. Left turns for the vehicle are accomplished by turning of the steering wheel in the opposite direction, in which the representations of Figs. 8 through 11 and a position beyond Fig. 11 will be accomplished but in that case the left spool LS will move inwardly as the right spool RS moves outwardly; or, just the reverse of Figs. 9 through 11.

When the steering arms RA and LA are moved to their new positions, in which case they function in their reverse range, the arms cross and extend radially from the shaft 84 in a zone substantially midway between the positions of the points 90 and 92 in full lines in Fig. 18. That is to say, the arm RA is now moved to the left side of the shaft and the arm LA is moved to the right side of the shaft. Both Figs. 18 and 20 are views of the mechanism as would be seen by the driver on the operator's seat and accordingly the expressions "right" and "left" will accord with those of the reader.

The manner in which the arms are moved between their two different positions is best illustrated in Figs. 19 through 22, Fig. 22 showing the arms in their forward-phase positions corresponding to the full line illustration in Fig. 18. The arms are mounted on the shaft 84 by helical key means including a pair of helical or spiral grooves 178 and 180 respectively for the right and left hand arms, plus a pair of pins or followers 182 and 184 which run respectively in the grooves, the grooves being formed in the underside of the shaft 84 and the pins being carried respectively by the arms RA and LA. It will thus be seen that if the shaft 84 is held against axial and angular movement and the arms are moved axially, the pins 182 and 184, in following the respective grooves 178 and 180, will cause the arms RA and LA to turn, the grooves being so arranged that axial movement of the arms rearwardly from the position of Fig. 22 to that of Fig. 21 will cause the arms to move angularly inwardly toward each other to the position of Fig. 20. Thus, the former angle of approximately 180° between the points 90 and 92 now becomes a minus angle, since the arms cross.

As the arms RA and LA cross, it follows that the points 90 and 92 are thus placed at opposite sides of a vertical center line through the steering shaft 84 and accordingly the links 80 and 82 are crossed, as illustrated by broken lines in Fig. 20. Consequently, both valve spools LS and RS will be moved to their reverse positions (Fig. 12). This follows, because movement of the right arm RA from its full line position of Fig. 18 to its dotted line position of that figure (also full lines in Fig. 20) is in the direction of movement of the spool RS to its Fig. 11 position. The same is true but in a reverse fashion of the movement of the arm LA and the spool LS. Consequently, positioning of the arms as in Fig. 20 (reverse range) gives the spools LS and RS new starting positions. That is to say, whereas the spools LS and RS started in straight-ahead positions (Fig. 8) when the steering arms are in their forward phase, the spools start at their reverse positions (Fig. 12) when the steering arms occupy their reverse phase.

As in the case of the description of right turn forward positions (Figs. 8 through 11), the description will cover right turn positions of the vehicle for rearward travel, it being understood that comparable results are accomplished in steering to the left during backward travel.

Looking now at Fig. 12, it will be seen that when both spools LS and RS are in their reverse positions, which produces straight rearward travel of the vehicle, pump discharge enters the left valve via the inlet line 94—114 and enters the axial passage 152 of the spool LS via the radial passage 154, exiting at 156 to flow to the opposite side of the left motor LM via the motor line 120—124. The fluid leaves the other side of the motor LM via the motor line 122—116 and enters the inlet 126 of the right valve via the cross connecting conduit or line 134. As will be seen by the descriptive arrows on Fig. 12, the fluid now flows through the opposite motor line 130—140 and returns from the other side of the motor via the motor line 138—128, entering the spool passage 172 and flowing along the axial passage 168 to exit at 170 to the discharge line 132—96. The illustration compares with that in Fig. 8, except that both motors, instead of rotating forwardly, are rotating rearwardly and at the same speed.

It will be recalled from the description of Figs. 9 through 11 that although the right spool RS moved inwardly and the left spool LS moved outwardly, to secure new functional positions for the right spool, the left spool effectively retained its straight-ahead position, which retention was not changed except when the steering wheel was turned to produce a position beyond that of Fig. 11. Substantially the same characteristics follow in movement of the spools among the positions of Figs. 12 through 14, with the exception that the movement of the left spool is substantially insignificant. Hence, it will retain its reverse or straight-rear position while the right spool changes position. This result is achieved because the points 90 and 92 move in different parts of a quadrant of a circle concentric with the steering shaft 84, as best illustrated in Fig. 20.

The starting positions of the arms LA and RA are represented respectively by the points $L_1$ and $R_1$, which respectively produce the positions of the spools LS and RS in Fig. 12. Once the arms LA and RA are moved to their positions of Fig. 20, they are then held against axial movement relative to the steering shaft 84 and consequently, since they cannot move relatively axially, they also cannot move relatively angularly. Hence, they are fixed in their new positions and must turn together with each other and with the shaft 84. Therefore, when the steering wheel 36 is turned to the right, the shaft 84 rotates in the same direction and the arms RA and LA move clockwise as seen in Fig. 20 through a range beginning at $R_1$—$L_1$ and ending at $R_3$—$L_3$, including intervening positions $R_2$ and $L_2$. Since the arms are fixed to the shaft 84, the angular distance therebetween will remain the same regardless of their positions while controlling the spools LS and RS. In other words, the angular distance between $L_2$ and $R_2$ will equal that between $L_1$ and $R_1$. However, since $R_1$ is initially leftwardly advanced as respects $L_1$, it will move upwardly in the quadrant while the point $L_1$ is moving substantially laterally in the same quadrant. Hence, the amount of vertical movement imparted to the links 80 and 82 will be substantially different. That is to say, when the point $R_1$ moves to $R_3$, it pulls the link 80 through a distance equal to the vertical distance between $R_1$ and $R_3$, which is sufficient to move the right spool from the position of Fig. 12 to that of Fig. 14. At the same time, the vertical distance between $L_1$ and $L_3$ is substantially insignificant and for all practical purposes may be considered as leaving the spool LS in its reverse position. In the case of a left turn while the vehicle is traveling rearwardly, the opposite will be true.

The positions $R_1$ and $L_1$, as previously described, produce the starting positions of the spools RS and LS as shown in Fig. 12. The positions $R_2$ and $L_2$ produce the valve spool positions of Fig. 13 and the arm positions $R_3$ and $L_3$ produce the spool positions of Fig. 14. In Fig. 13, a shunt effect is achieved, causing diversion of part of the fluid from the line 134—126, via the shunt flat 174 on the land 158, to the discharge line 132—96, hence resulting in a decrease in speed of the right motor RM. Since the left spool substantially maintains its original position, the speed and direction of the left motor LM remain the same and the vehicle will swing in a wide turn to the right and in a backward direction. In Fig. 14, the spool RS has moved outwardly beyond its position of Fig. 13 and the volume of shunted fluid is increased, with the result that the speed of rotation of the right motor is still further decreased. At the same time, the left spool occupies substantially its original position so as to retain the speed and direction of the left wheel and left motor. As in the case of Fig. 10, but in the opposite phase, ground resistance to the right wheel while the right spool occupies the Fig. 14 position may be sufficient to stop the right wheel, in which case the turn to the right and in the rearward direction will be considerably shorter than that achieved by the valve positions of Fig. 13. In the particular design of linkage illustrated, the valve position of the spool RS in Fig. 14 is just short of a maximum position (not shown) which maximum position is achieved by further movement of the spool RS to the left so that the cut-off 176 on the land 160 clears the port 126 to enable reverse rotation of the right motor. In most cases, however, the maneuverability required in reverse travel is not as critical as that required in forward travel and the maximum position could be omitted.

The mechanism for obtaining the different positions of the steering arms RA and LA relative to the steering shaft 84 includes the helical key means previously described and further includes what may be termed selector means S best shown in Figs. 17 and 19. This means comprises a selector rod 186 carried in the support 86 for axial shifting along a line parallel to the axis of the steering shaft 84. The upper or rear end of the selector shaft 186 is provided with three notches 188, 190 and 192, respectively, for selected cooperation with a locking or releasable means in the form of a spring pressed detent ball 194. Consequently, the selector rod 186 has three positions; namely, forward, neutral and reverse. The selector rod is shown in its forward position in Fig. 19, in which the detent 194 engages the detent notch 188. The detent notch 190 is for the neutral position and the detent notch 192 is for the reverse position.

The selector rod 186 carries fork means including front and rear forks 196 and 198 which engage respectively ahead of and behind the arms RA and LA, the two arms abutting each other to afford a compact unit.

Thus, as the selector rod 186 is shifted among its three positions, the front and rear forks 196 and 198 will cause axial movement of the arms RA and LA, which axial movement, as previously described, incurs angular movement of the arms between their positions of Fig. 20 and Fig. 18 (full lines in the latter).

The means for shifting the selector rod 186 includes a shifter yoke 200 secured to a rockshaft 202 and forming a bell crank with an operator arm 204. This arm is connected by a link 206 to a bell crank lever 208 which is suitably fulcrumed on the side of the mounting means 38 as by a pivot 210. Hence, rearward movement of the lever 208 will cause counterclockwise rocking of the rockshaft 202 and will therefore move the yoke 200 and selector shaft 186 rearwardly from the position of Fig. 19 to either of the previously described neutral or reverse positions. The various phases of movements of the several components are illustrated in broken lines in Fig. 17.

A pedal 212 is fulcrumed at 214 on the main frame 20 and has a stop pin 216 engageable behind an upstanding lever 218. The fulcrum point 214 comprises a rockshaft on which the pedal 212 is rockable and to which the lever arm 218 is affixed. The lever 218 has a rearwardly extending lever arm 220 rigid therewith and connected by a link 222 with the hand lever 208 at a pivot and slot connection 224. In axially spaced relationship to the lever arms 218 and 220, the rockshaft 214 has fixed thereto a depending lever 226 which is biased by a spring 228 to cause the rockshaft 214 to normally turn in a counterclockwise direction, during which phase of its operation it engages a plunger 230 for controlling a relief and unloading valve 232 (Fig. 16) in the left valve LV. The plunger 230 acts through a spring 234 against a small check ball 236 which controls a passage 238. This passage enters a vertical bore 240 which is normally closed by a larger check valve plunger 242 under action of a spring 244. The bore 240 is in register with the left valve inlet port 114 and the plunger 242 has an axial passage 246 opening at its upper end as a restricted orifice 248. The general theory of operation of the relief valve 232 is that high pressure entering the plunger passage 246 is equalized at opposite sides of the valve as long as the orifice 238 is closed by the small check ball 236. However, when the pressure in the chamber above the valve 242 becomes sufficiently high to displace the ball 236, a pressure drop occurs across the orifice 248 which causes the larger check valve plunger 242 to open. The effect of the relief valve can be negatived by movement of the lever 226 from the full line position of Fig. 16 to the dotted line position of that figure, in which case the load of the plunger 230 on the spring 234 is relieved and consequently virtually no pressure is required to lift the small ball check 236 from its seat over the orifice 238, whereupon the fluid entering at the inlet line 94—114 will be returned to the reservoir via a relief valve return 250 which is suitably connected to the reservoir 56 in the front axle housing 26. The details of the relief valve mechanism are unimportant except as respects the control thereof by the lever 226.

This control is effected when the selector means is in its neutral position. When the selector means is in either its forward or reverse position, the lever 226 engages the plunger 230 to establish its normal position as shown in full lines in Fig. 16. This operation will be apparent from the broken line illustrations of the various components in Fig. 17, wherein it will be seen that the arc through which the point 224 swings rearwardly with the hand lever 208 has as its center the pivot connection of the link 222 to the lever arm 220. Hence as the point 224 travels along this arc, it will exert an upward pull on the link 222 as the lever 208 passes between its front and rear positions. This upward pull on the link 222 is sufficient to rock the rockshaft 214 and hence to swing the lever 226 rearwardly to the dotted line position shown in Fig. 16, thereupon relieving the load on the small ball check spring 234. However, when the lever 208 is moved to its rearwardmost position, the link 222 is returned or moved downwardly and the full line position of the lever arm 226 is again achieved.

The relief valve spring load can be lightened by use of the pedal 212 without effect on the selector means, since its pin 216 engages behind the lever arm 218. The purpose of the one-way connection at 216—218 is to prevent the pedal 212 from moving downwardly when the hand lever 208 is utilized, the normal position of the pedal 212 being maintained by a spring 252 which acts against a stop 254 carried by the support 38.

*Operation—forward*

In this phase of operation, the selector lever 208 will be in the full line position shown in Fig. 17, with the result that the selector rod 186 will be in the Fig. 19 position, the forward notch 188 being engaged by the detent 198. The arm 226 will be in its forward (full line) position and the check valve spring 234 will be normally loaded to effectuate the circuit. With the selector in this position, the steering arms RA and LA will be in the full line positions of Fig. 18. When the steering wheel 36 is in its central position, the valve spools LS and RS will be in the positions shown in Fig. 8, with the result that the vehicle will travel straight ahead. Turning of the steering wheel 36 to the right, or clockwise, will achieve any of the positions of Figs. 9, 10, 11 or a position beyond Fig. 11. For example, if a wide turn to the right is desired, the steering wheel will be turned far enough to achieve the valve spool positions of Fig. 9, in which the right spool RS has moved in slightly and the left spool, having moved out slightly, still retains its straightahead position. In other words, the fluid flow will still be in series from the pump to the left motor and back to the right motor and then to the reservoir. The difference between Figs. 8 and 9 is that part of the fluid flow from the left valve to the right valve via the inlet 134—126 of the latter will be diverted past the shunt flats 174 on the right spool land 160, the diverted fluid being shunted to the discharge line 132—96. Consequently, the right motor will be slowed to some degree while the left motor retains its speed and direction. A sharper turn will be attained as the steering wheel is turned farther to the right to proceed from the Fig. 9 position to the Fig. 10 position, the result in the latter being that more fluid is diverted to the right valve discharge line 132—96. These results are readily seen by comparing the relative weights of the fluid flow arrows.

Figure 6:
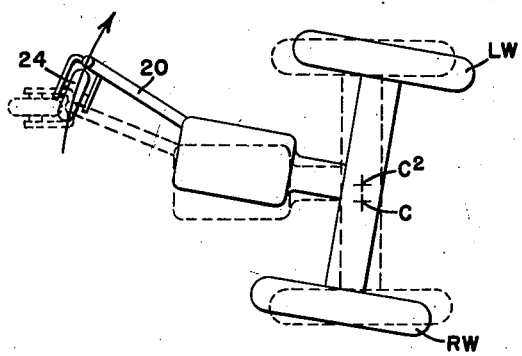

Still further turning of the steering wheel to the right will achieve the Fig. 11 position, in which the left spool, although moving outwardly, still retains its straightahead effect on fluid flow, but the right spool has moved inwardly to a point in which the land 160 cuts off the inlet line 134—126 from the motor line 128—138 and instead communicates the inlet line to the other motor line 130—140, whereupon the right motor reverses while the left motor retains its forward speed and direction. As previously indicated, the type of turn achieved by the valve spool positions of Fig. 11 is represented in Fig. 6, the vehicle in effect pivoting about the point C².

If the steering wheel is turned to its maximum rightward position, the positions of Fig. 11 will be exceeded; that is, the valve spool LS will move farther outwardly than it is and the right spool RS will move farther inwardly. However, the design of the valves is such that the reverse position of the right spool, attained in Fig. 11, will be retained, even though the valve does move. But, the further leftward movement of the spool LS finally takes the spool out of its straight-ahead position, since the cut-off edge 176 now passes the right hand edge of the motor port 116, whereupon inlet flow from 94—114 can by-pass the motor by passing around the land 144 to the discharge line 118—134. Although the motor lines 116—122 and 124—120 are still in communication with the valve bore, the fluid will follow the path of least resistance and therefore will by-pass the motor, particularly in operation of the vehicle over fairly rough ground in which the ground itself will afford sufficient resistance to forward travel of the left wheel (in the circumstances considered) as to cause that wheel to stop. Since the right motor retains its reverse direction and speed, the type of turning illustrated in Fig. 7 will be achieved, the pivot of the vehicle being generally about the point C³.

It will be understood, of course, that turns to the left while the vehicle is traveling forwardly may be obtained by turning of the steering wheel to the left, with the result that the spools will be manipulated symmetrically as respects the positions illustrated in Figs. 9 through 11.

*Operation—reverse*

Operation of the vehicle in the reverse phase is preceded, of course, by the requirement that the selector means S be operated to achieve the Fig. 20 positions of the steering arms RA and LA. As already described, the new position of the selector may be effected by rearward swinging of the lever 208 to its rearwardmost position. As the lever passes to its rearwardmost position, it passes through a neutral position in which the relief valve is unloaded as set forth above. For present purposes, the reason for the neutral position will be considered to have been set forth adequately above and will therefore require no repetition except to state that as the lever 208 attains its rearward position the arm 226 returns to its forward or full line position (Figs. 16 and 17) to again normally load the check valve spring 234.

With the selector rod in its rear position, the reverse notch 192 will be engaged by the detent ball 194 and the selector will thus be retained, unless forcibly displaced. At this time, the relief valve plunger 230 is again loaded by the lever 226 and the circuit is conditioned for operation, except in a reverse phase because of the effect that turning of the steering wheel will have on the valve spools because of the crossed arms RA and LA.

To start with, the two spools LS and RS are moved to their new positions, which positions correspond respectively to the former reverse positions of the spools. That is to say, the spool RS occupies substantially the same position in Fig. 12 as it does in Fig. 11 and the spool LS occupies the same position in Fig. 12 that it would were the steering wheel turned fully to the left during its straight-ahead phase. Accordingly, with both spools in their reverse positions, the vehicle will travel straight rearwardly.

Turning of the vehicle slightly to the right or in a wide turn will be accomplished by turning the steering wheel clockwise or to the right so that the free end 90 of the arm moves from the point $R_1$ to the point $R_2$, thus giving the spool RS its Fig. 13 position. As previously stated, movement of the valve spool LS is negligible because of the type of movement of the point 92 from $L_1$ to $L_2$. Therefore, the left spool retains it starting position while the position of the right spool changes. Consequently, part of the flow from the left valve to the right valve via the motor line 134—126 will be diverted to the discharge line 132—96 via the shunt flats 174 on the right spool land 158.

A still sharper turn to the right may be achieved by turning the steering wheel so that the point 90 moves to the position $R_3$ of Fig. 20, thus producing the effect of Fig. 14, wherein it will be seen that again the left spool retains its starting position while the right spool moves farther to the left. The right spool in these conditions diverts a still greater volume of fluid to the discharge line 132—96 via the shunt flats 174 on the right spool land 158, with the result that the speed of the right motor is further decreased while the speed and direction of the left motor is retained.

The position of the spools in Fig. 13 will produce a right turn that is just the reverse of that shown in Fig. 4; and the spool positions of Fig. 14 will produce a turn just the reverse of that in Fig. 5, assuming, of course, that ground resistance to rotation of the right wheel substantially stops that wheel so that the pivot of the machine will be substantially about the point $C^1$.

It was previously indicated that the design of the particular linkage here was based on the achievement of the reverse of Figs. 4 and 5 (and comparable positions to the left) plus the reverse (and duplications) of Fig. 6. However, the reverse of Fig. 7 (and similar positions to the left) are not normally required; although, it will be readily seen that the linkage could be very simply modified to eliminate the reverse of Fig. 6.

It will be appreciated of course that left turns in reverse will be achieved by turning the steering wheel to the left while the steering arms RA and LA occupy their reverse-phase positions as shown in Fig. 20, giving results just the reverse of those in Figs. 13 and 14 and that position beyond Fig. 14 as described above.

*Summary*

The foregoing description is based on the enumeration of the most significant features of the invention, including the series connection of the pump, valves, and motors, the mechanical means for reversing the valves to obtain steering in a reverse direction, the neutralizing of the circuit by unloading the relief valve, and other specific features consonant with the disclosure of these broad features. Various features not specifically enumerated will undoubtedly occur to those versed in the art, as will many modifications and alterations in the preferred embodiment of the invention disclosed, all of which may be achieved without a departure from the spirit and scope of the invention.

What is claimed is:

1. In a vehicle having left and right wheels: a hydraulic driving and steering system comprising left and right rotary reversible fluid motors drivingly connected respectively to the left and right wheels; a pressure source including a pump and a reservoir; a left valve having an inlet connected to the pump, an outlet, and a pair of motor lines connected to opposite sides of the left motor; a right valve having an inlet connected to the left valve outlet, an outlet connected to the reservoir, and a pair of motor lines connected to opposite sides of the right motor; right and left valve members respectively in the right and left valves, each valve member being settable in a straight-ahead condition to connect its inlet to one of its motor lines and its other motor line to its outlet, each valve member being movable in one direction from its straight-ahead condition to a turn condition diverting part of its inlet flow to its outlet for slowing its motor and movable additionally in said one direction to a reverse condition reversing the inlet and outlet connections to the associated motor lines; each valve member being further movable in the opposite direction from its straight-ahead condition to a by-pass condition by-passing its motor; actuating linkage interconnecting the valve members and settable in a forward phase to start both members in their straight-ahead conditions to incur forward travel of the vehicle, said actuating linkage being operative in said forward phase to move either valve member to its turn and reverse conditions while retaining the effective straight-ahead condition of the other valve member so as to respectively slow and reverse one motor while retaining the speed and forward direction of the other motor, and said linkage being further operative in said forward phase to move either valve member in the aforesaid opposite direction to its by-pass condition and to simultaneously move the other valve member in the aforesaid one direction to its reverse condition to cut out one motor while reversing the other; said actuating linkage being convertible to a backward phase to simultaneously move both valve members to their reverse conditions to incur straight reverse travel of the vehicle, said actuating means in said backward phase being operative to move either valve member back to its turn condition while retaining the effective reverse condition of the other valve member; and selector means connected to and for selectively converting the linkage between its forward and backward phases.

2. In a vehicle having left and right wheels: a hydraulic driving and steering system comprising left and right rotary reversible fluid motors drivingly connected respectively to the left and right wheels; a pressure source including a pump and a reservoir; a left valve having an inlet connected to the pump, an outlet, and a pair of motor lines connected to opposite sides of the left motor; a right valve having an inlet connected to the left valve outlet, an outlet connected to the reservoir, and a pair of motor lines connected to opposite sides of the right motor; right and left valve members respectively in the right and left valves, each valve member being settable in a straight-ahead condition to connect its inlet to one of its motor lines and its other motor line to its outlet, each valve member being movable in one direction from its straight-ahead condition to a turn condition diverting part or its inlet flow to its outlet for slowing its motor and movable additionally in said one direction to a reverse condition reversing the inlet and outlet connections to the associated motor lines; actuating linkage interconnecting the valve members and settable in a forward phase to start both members in their straight-ahead conditions to incur forward travel of the vehicle, said actuating linkage being operative in said forward phase to move either valve member to its turn and reverse conditions while retaining the effective straight-ahead condition of the other valve member so as to respectively slow and reverse one motor while retaining the speed and forward direction of the other motor; said actuating linkage being convertible to a backward phase to simultaneously move both valve members to their reverse conditons to incur straight reverse travel of the vehicle, said actuating means in said backward phase being operative to move either valve member back to its turn condition while retaining the effective reverse condition of the other valve member; and selector means connected to and for selectively converting the linkage between its forward and backward phases.

3. In a vehicle having left and right wheels: a hydraulic driving and steering system comprising left and right rotary reversible fluid motors drivingly connected respectively to the left and right wheels; a pressure source including a pump and a reservoir; left and right valves connected to the pressure source and to the motors for selectively controlling the motors to drive and steer the vehicle forwardly or reversely, each valve including a valve member movable through a control range in one direction from a straight-ahead position to motor-slowing position and thence to a motor-reversing position and movable in the opposite direction back to said straight-ahead position; a steering control member selectively movable to the right or left of a central position; and actuating means connecting the valve members to the steering control member for controlling the valve members by said steering control member, said actuating means being bi-positionably associated with the steering control member and connectible thereto for movement thereby in a forward phase starting both valve members in their straight-ahead positions or in a backward phase starting both valve members in their motor-reversing positions, said actuating means in its forward phase being operative upon movement of the steering control member to the right or left of its central position to move the respective right or left valve member in said one direction through said range while effectively retaining the straight-ahead position of the other valve member and said actuating means in its backward phase being operative upon movement of the steering control member to the right or left of its central position to move the respective right or left valve member in the opposite direction from its motor-reversing position while effectively retaining the motor-reversing position of the other valve member.

4. In a vehicle having left and right wheels: a hydraulic driving and steering system comprising left and right rotary reversible fluid motors drivingly connected respectively to the left and right wheels; a pressure source including a pump and a reservoir; left and right valves connected to the pressure source and to the motors for selectively controlling the motors to drive and steer the vehicle forwardly or reversely, each valve including a valve member movable through a control range in one direction from a straight-ahead position to motor-slowing position and thence to a motor-reversing position and movable in the opposite direction back to said straight-ahead position; a steering control member selectively movable to the right or left of a central position; right and left link means connected respectively to the valve members; and right and left actuators connected individually to the right and left link means and bi-positionably connectible to the steering control member for movement thereby to move the valve members via the respective link means, said actuators having a forward phase effective to start both valve members in their straight-ahead positions while the steering control member is in its central position and to cause movement of the steering control member to the right to act through the right link means to move the right valve member in said one direction while acting through the left link means to effectively retain the straight-ahead position of the left valve member and vice versa, said actuators having a rearward phase effective to start both valve members in their motor-reversing positions while the steering control member is centrally positioned and to cause movement of the steering control member to the right to act through the right link means to move the right valve member in the opposite direction while acting through the left link means to effectively retain the reverse position of the left valve member and vice versa.

5. In a vehicle having left and right wheels: a hydraulic driving and steering system comprising left and right rotary reversible fluid motors drivingly connected respectively to the left and right wheels; a pressure source including a pump and a reservoir; left and right valves connected to the pressure source and to the motors for selectively controlling the motors to drive and steer the vehicle forwardly or reversely, each valve including a valve member movable through a control range in one direction from a straight-ahead position to a motor-slowing position and thence to a motor-reversing position and movable in the opposite direction back to said straight-ahead position; a steering control member selectively rockable to the right or left of a central position; right and left actuator arms mounted on the steering control member for selective angular adjustment relative to said control member and relative to each other for positioning of the arms selectively in either a first phase in which the arms extend radially from said member in substantially diametrically opposed relation or in a second phase in which said arms extend radially from said member in crossed relation in a position intermediate the positions of the arms in said first phase; and right and left fixed-length link means connecting the right and left valve members respectively to the right and left arms and effective in one phase of the arms to give each valve member a starting position corresponding to its straight-ahead position and effective in the other phase of said arms to give each valve member a starting position corresponding to its motor-reversing position; and means for selectively fixing the arms to the steering control member in each phase so that rocking of the steering control member to the right or left respectively moves the right or left valve member from its starting position while retaining the effective starting position of the other valve member.

6. A hydraulic control system, comprising: a fluid pressure circuit including first and second valves respectively having first and second valve members, each valve member being movable from a normal starting position to an end position and return; a control shaft rockable selectively in opposite angular directions about its axis; first and second link means connected respectively to the valve members and extending toward the shaft; first and second arms connected respectively to the first and second link means and normally positioned to extend radially from the shaft with a certain angle included between them; helical key means mounting the arms on the shaft for axial movement of the arms relative to the shaft to cause the arms to turn symmetrically in opposite angular directions relative to each other and relative to the shaft to new positions including a different angle between them and thus to act through the link means to change the starting positions of the valve members; and means for securing the arms against axial movement relative to the shaft in either their normal or new positions so that rocking of the shaft moves the arms to move the valve members via the link means.

7. The invention defined in claim 6, including: selector means movable selectively in opposite directions axially of the shaft between first and second positions and engaging the arms for shifting the arms between their normal and new positions.

8. The invention defined in claim 7, in which: the fluid pressure circuit includes a relief circuit portion and a normally closed relief valve therein set to open at a predetermined pressure; and the selector means is connected to the relief valve for conditioning said relief valve to open at a lower pressure in response to positioning of the selector means intermediate the first and second positions of said selector means.

9. The invention defined in claim 7, in which: the fluid pressure circuit includes an unloading valve connected to the selector means to effectuate the circuit when the selector means is in its first and second positions and operative to unload and disable the circuit when the selector means is intermediate said first and second positions.

10. A hydraulic control system, comprising: a fluid pressure circuit including first and second valves respectively having first and second valve members, each valve member being movable from a normal starting position to an end position and return; a control shaft rockable selectively in opposite angular directions about its axis; first and second link means connected respectively to the valve members and extending toward the shaft; first and second arms connected respectively to the first and second link means and normally positioned to extend radially from the shaft with a certain angle included between them; means mounting the arms on the shaft for angular movement of the arms relative to the shaft and relative to each other to turn symmetrically in opposite angular directions relative to new positions including a different angle between them and thus to act through the link means to change the starting positions of the valve members; and means for securing the arms to the shaft in either their normal or new positions so that rocking of the shaft moves the arms to move the valve members via the link means.

11. The invention defined in claim 10, including: bi-positionable selector means connected to and for moving the arms between their normal and new positions; and means releasably securing the selector means against change of position.

12. A hydraulic control system, comprising: a fluid pressure circuit including first and second valves respectively having first and second valve members, each valve member being movable from a normal starting position to an end position and return; a control shaft rockable selectively in opposite angular directions about its axis; first and second link means connected respectively to the valve members and extending toward the shaft; first and second arms connected respectively to the first and second link means and normally positioned to extend radially from the shaft in substantially diametrically opposed relation and acting through the respective link means to place the valve members in their respective starting positions; helical key means mounting the arms on the shaft for axial movement of the arms relative to the shaft to cause the arms to turn symmetrically in opposite angular directions relative to each other and relative to the shaft to new positions in which the arms occupy positions substantially angularly midway between their diametrically opposed positions to act through the respective link means to place the valve members at their respective end positions; and means for securing the arms against axial movement relative to the shaft in either their normal or new positions so that rocking of the shaft moves the arms to move the valve members via the link means.

13. A hydraulic control system, comprising: a fluid pressure circuit including first and second valves respectively having first and second valve members, each valve member being movable from a normal starting position to an end position and return; a control shaft rockable selectively in opposite angular directions about its axis; first and second link means connected respectively to the valve members and extending toward the shaft; first and second arms connected respectively to the first and second link means and normally positioned to extend radially from the shaft in substantially diametrically opposed relation and acting through the respective link means to place the valve members in their respective starting positions; means mounting the arms on the shaft for angular movement of the arms relative to the shaft and relative to each other to turn symmetrically in opposite angular directions relative to new positions in which the arms occupy positions substantially angularly midway between their diametrically opposed positions to act through the respective link means to place the valve members at their respective end positions; and means for securing the arms to the shaft in either their normal or new positions so that rocking of the shaft moves the arms to move the valve members via the link means.

14. A hydraulic control system, comprising: a fluid pressure circuit including first and second valves respectively having first and second valve members, each valve member being movable from a normal starting position to an end position and return; a control shaft rockable selectively in opposite angular directions about its axis; first and second link means connected respectively to the valve members and extending toward the shaft; first and second arms connected respectively to the first and second link means and normally positioned to extend radially from the shaft to dispose the free ends of the arms in substantially diametrically opposite relation equidistant from the valve members so as to act through the respective link means to place the valve members in their respective starting positions; helical key means mounting the arms on the shaft for axial movement of the arms relative to the shaft to cause the arms to turn symmetrically in opposite angular directions relative to each other and relative to the shaft to new positions in which the free ends of the arms are equidistant from the valve members but at a distance different from that of the free ends of said arms when normally positioned so as to act through the respective link means to place the valve members at their respective end positions; and means for securing the arms against axial movement relative to the shaft in either their normal or new positions so that rocking of the shaft moves the arms to move the valve member via the link means.

15. A hydraulic control system, comprising: a fluid pressure circuit including first and second valves respectively having first and second valve members, each valve member being movable from a normal starting position to an end position and return; a control shaft rockable selectively in opposite angular directions about its axis; first and second link means connected respectively to the valve members and extending toward the shaft; first and second arms connected respectively to the first and second link means and normally positioned to extend radially from the shaft to dispose the free ends of the arms in substantially diametrically opposite relation equidistant from the valve members so as to act through the respective link means to place the valve members in their respective starting position; means mounting the arms on the shaft for angular movement of the arms relative to the shaft and relative to each other to turn symmetrically in opposite angular directions relative to new positions in which the free ends of the arms are equidistant from the valve members but at a distance different from that of the free ends of said arms when normally positioned so as to act through the respective link means to place the valve members at their respective end positions; and means for securing the arms to the shaft in either their normal or new positions so that rocking of the shaft moves the arms to move the valve members via the link means.

16. Control mechanism, comprising: a support; a shaft rotatably carried by the support; a pair of arms extending radially from the shaft in normal positions with a certain angle included between them; helical key means connecting the arms to the shaft for axial and angular movement of the arms relative to the shaft to turn symmetrically in opposite angular directions to new positions with a different angle between them; a selector rod in parallelism with the shaft; means mounting the rod on the support for selective back and forth shifting along a path parallel to the shaft; means on the rod and engaging the arms for incurring axial shifting and thus turning of the arms by selective back and forth shifting of the rod; and releasable means retaining the rod against shifting and thus retaining the arms against axial movement so that the helical key means causes the arms to turn with the shaft.

17. Control mechanism, comprising: a support; a shaft rotatably carried by the support; a pair of arms extending radially from the shaft in normal positions with a certain angle included between them; helical key means connecting the arms to the shaft for axial and angular movement of the arms relative to the shaft to turn symmetrically in opposite angular directions to new positions with a different angle between them; selector means carried by the support for selective back and forth movement along a path lengthwise of the shaft; means interconnecting the selector means and the arms for incurring axial shifting and thus turning of the arms by selective back and forth shifting of the selector means; and releasable means retaining the selector means against shifting and thus retaining the arms against axial movement so that the helical key means causes the arms to turn with the shaft.

References Cited in the file of this patent
UNITED STATES PATENTS

| | | |
|---|---|---|
| 2,361,098 | Higby | Oct. 24, 1944 |
| 2,771,958 | Ball | Nov. 27, 1956 |
| 2,774,434 | Ferris | Dec. 18, 1956 |